(12) United States Patent
Simnacher (10) Patent No.: US 7,956,485 B1
(45) Date of Patent: Jun. 7, 2011

(54) POTENTIAL ENERGY STORAGE APPARATUS USING ENERGY FROM A WIND ENERGY GENERATOR

(76) Inventor: Larry W. Simnacher, Bay City, TX (US)

( * ) Notice: Subject to any disclaimer, the term of this patent is extended or adjusted under 35 U.S.C. 154(b) by 280 days.

(21) Appl. No.: 12/370,446

(22) Filed: Feb. 12, 2009

(51) Int. Cl.
*F03D 9/00* (2006.01)

(52) U.S. Cl. .............................. 290/55; 60/398; 417/905

(58) Field of Classification Search .............. 290/54–55; 60/398; 415/905
See application file for complete search history.

(56) References Cited

U.S. PATENT DOCUMENTS

| | | | |
|---|---|---|---|
| 124,843 A | 3/1872 | Millard | |
| 512,352 A | 1/1894 | Zwiebel | |
| 3,487,228 A | 12/1969 | Kriegel | |
| 3,806,733 A * | 4/1974 | Haanen | 290/55 |
| 3,945,755 A | 3/1976 | Gentile | |
| 4,151,719 A | 5/1979 | Boots | |
| 4,159,427 A | 6/1979 | Wiedemann | |
| 4,201,059 A * | 5/1980 | Feder | 60/639 |
| 4,206,608 A | 6/1980 | Bell | |
| 4,311,011 A * | 1/1982 | Lewis | 60/641.15 |
| 4,321,475 A | 3/1982 | Grub | |
| 4,495,424 A | 1/1985 | Jost | |
| 4,514,977 A | 5/1985 | Bowen | |
| 4,589,344 A * | 5/1986 | Davison | 104/24 |
| 4,753,078 A * | 6/1988 | Gardner, Jr. | 60/668 |
| 4,757,211 A | 7/1988 | Kristensen | |
| 5,905,312 A | 5/1999 | Liou | |
| 6,100,600 A | 8/2000 | Pflanz | |
| 6,359,347 B1 | 3/2002 | Wolf | |
| 6,420,794 B1 | 7/2002 | Cao | |
| 6,766,643 B2 | 7/2004 | Christensen | |
| 2009/0193808 A1* | 8/2009 | Fiske | 60/721 |
| 2010/0301609 A1* | 12/2010 | Kim et al. | 290/54 |

* cited by examiner

*Primary Examiner* — Michael C Zarroli
(74) *Attorney, Agent, or Firm* — Egbert Law Offices PLLC (57) ABSTRACT

An apparatus and method for storing and using wind energy. The apparatus has a hub, blades extending radially outwardly from the hub, a first shaft interconnected to the hub, a generator connected to the first shaft, a first coupler, a transmission connected to a portion of the first shaft opposite the hub, a second shaft extending from the transmission, a second coupler, a first pulley connected to the second shaft, a second pulley positioned below the first pulley, a line extending around the first and second pulleys, a fluid receptacle affixed to the line, an elevated reservoir positioned adjacent the first pulley, a base reservoir positioned below the second pulley, a pump positioned between the elevated reservoir and the base reservoir, and a control valve connected to the elevated reservoir.

20 Claims, 3 Drawing Sheets

POTENTIAL ENERGY STORAGE APPARATUS USING ENERGY FROM A WIND ENERGY GENERATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to apparatus for storing energy produced by wind energy generators. More particularly, the present invention relates to apparatus for using energy produced by wind energy generators. More particularly, the present invention relates to the action of gravity and the flowing of fluid for the storage of energy during non-peak wind conditions.

2. Description of Related Art Including Information Disclosed Under 37 CFR 1.97 and 37 CFR 1.98.

Wind energy is a prime source of non-polluting renewable energy that is available to the world population. Typically, wind turbines operate by the rotation of propellers and/or blades as caused by the action of wind blowing thereacross. As wind blows at a given velocity, the blades of the turbine rotate so as to rotate a shaft of a generator so as to generate electricity. The amount of electricity generated depends upon the strength of the wind that is blowing across the blades.

One of the main problems with wind energy as a resource for the production of electricity is that wind is not constant. When wind blows below a certain velocity, the blades do not rotate and no energy is be generated. This is particularly the case at nighttime hours when the wind is not blowing. As a result, it is possible that no energy is produced during non-peak hours even though demand for energy still exists during non-peak hours. Thus, there is a need to be able to effectively store at least some of the energy that is produced during peak conditions for use during non-peak conditions.

In order to have an effective wind energy storage apparatus, it is important that the storing of electricity not require more energy than was produced by the wind energy generator during peak operating conditions. It is possible to use batteries for storing energy. Unfortunately, batteries are costly and can be extremely heavy for the amounts of energy needed to be stored for use during non-peak hours. Moreover, batteries lose their ability to adequately recharge over time and must be replaced, which adds to the cost of using batteries for the present goal. As such, a need has developed in order to produce a system whereby wind energy can be cheaply stored during peak wind conditions for use during non-peak wind conditions.

In the past, various U.S. patents have issued relating to the use of fluids for the storage of wind energy. For example, U.S. Pat. No. 512,352, issued on Jan. 9, 1894 to Zwiebel, discloses a wind mill attached to a pair of bucket elevators. When wind blows, the windmill turns one of the bucket elevators so as to lift sand from a lower compartment to an upper compartment. When the windmill does not turn, a chute is opened so as to allow sand from the upper compartment to travel into the buckets of the other bucket elevator so as to cause the buckets to return the sand to the lower compartment. The turning of the other bucket elevator by the weight of the falling sand creates work for use while the windmill is not turning.

U.S. Pat. No. 124,843, issued on Mar. 19, 1872 to Millard, discloses a hydraulic motor that has pulleys, a continuous chain wrapped around the pulleys, buckets attached along the length of the continuous chain, a first tube in which the buckets travel downwardly through as they are filled with water, and a second tube fluidly connected to the first tube so as to supply the buckets within the first tube with water. The continuous chain contracts upon a decrease in temperature and expands upon an increase in temperature.

U.S. Pat. No. 4,151,719, issued May 1, 1979 to Boots, discloses a water motor that has an endless series of buckets arranged for movement about a generally rectangular path of travel to present an uppermost, horizontal, loading flight whereby each bucket may be completely filled with water from an overlying basin prior to its descent along a vertical power flight of the motor. The buckets are pivotally supported for free swinging movement. A trip mechanism adjacent the lowermost end of the power flight individually empties the buckets at the end of their descent. A water outlet in the overlying basin extends longitudinally along the full length of the loading flight and has a baffle for controlling the flow of water to the buckets. A pair of endless roller chains secured at opposite ends of the respective buckets are operably coupled with an output shaft for powered rotation of the latter in response to movement of the buckets along their rectangular path of travel.

U.S. Pat. No. 3,945,755, issued on Mar. 23, 1976 to Gentile, discloses an apparatus for transmitting torque to a load. The apparatus includes a pair of pulleys vertically spaced apart by a great distance for movably mounting a long endless belt in a substantially vertical disposition so as to move the belt freely in a closed loop path. Spaced-apart arm devices connect to and extend from the belt. Weights are carried by the arm devices. The weights and the arm devices are arranged in pairs. Each one of the pairs provides a larger moment acting through the belt on at least one of the pulleys when falling vertically downwardly under the force of gravity. Conversely, each of the pairs provides a relatively smaller opposing moment acting through the belt on at least one of the pulleys when being pulled vertically upwardly by the belt. The torque is transmitted from at least one of the pulleys for driving the load.

U.S. Pat. No. 5,905,312, issued on May 18, 1999 to Liou, discloses a system for generating electricity by gravity. The system includes tanks mounted on a circulating device. When the tanks receive a working medium descending from a higher place by gravity, the circulating device is driven to circulate along a guiding device so as to drive a working shaft of a generator for generating electricity. A transmission mechanism is added between the circulating device and the working shaft to increase the rotational speed of the working shaft.

U.S. Pat. No. 4,757,211, issued on Jul. 12, 1988 to Kristensen, discloses a machine for generating electricity that has housing, a hub shaft positioned within the housing, blades connected to a front of the hub shaft, and a gear box positioned immediately behind the hub shaft. The housing is specially formed with a tapered part and a cylindrical part. The body has a front end that faces upwind. Bolt holes and flanges are positioned for optimum energy generation.

U.S. Pat. No. 4,201,059, issued on May 6, 1980 to Feder, discloses an arrangement of constructed elements used for the conversion of fluctuating natural energy and generation of constant rotary speed of a power-producing machine or motor, electric or otherwise, by way of free-falling masses in the place of commonly used regulators or governors. With this arrangement, the invention realizes a transmission for which, in contrast to known transmissions, the output speed is constant regardless of the input speed so long as the input torque is equal to or greater than the output torque.

U.S. Pat. No. 3,487,228, issued on Dec. 30, 1969 to B. Kriegel, discloses a power generating apparatus in which water is allowed to fall from an elevated position to a lower position for the movement of a piston associated with the generation of energy. A suitable pump is connected thereto so as to cause the liquid to rise after fallen by gravity.

U.S. Pat. No. 4,159,427, issued on Jun. 26, 1979 to H. O. Wiedemann, discloses an apparatus for utilizing natural energies. The energy extracting and storing equipment is installed in a floating vessel or raft. The energy storing equipment includes flywheel-type roller or cylinders driven by electric motors energized by electric generators which, in turn, receive the energy from the energy extracting equipment.

U.S. Pat. No. 4,206,608, issued on Jun. 10, 1980 to T. J. Bell, discloses a natural energy conversion, storage and electricity generation system. The natural energy is utilized to pressurize hydraulic fluid. The hydraulic fluid is temporarily stored within the high pressure storage tanks to be utilized in the production of electricity. Excess electricity which is generated by hydroelectric devices by the pressurized hydraulic fluid is utilized to pressurize additional hydraulic fluid. The additional hydraulic fluid is then supplied to the high pressure storage tanks to be used at a later time for the production of electricity. The high pressure storage tanks are initially charged with a compressible fluid which is compressed by the pressurized hydraulic fluid.

U.S. Pat. No. 4,321,475, issued on Mar. 23, 1982 to R. Grub, discloses a hydro-electric generating arrangement which includes a container that is situated below the upper level of a body of water and has an inlet and an outlet. The water from the body of water is admitted into the receiving space bounded by the container through the inlet, and drives a turbine. The water is pumped out of the receiving space through an outlet by energy derived by the force of wind or by excess electric energy derived from an electric distribution network during off-peak periods.

U.S. Pat. No. 4,495,424, issued on Jan. 22, 1985 to B. Jost, discloses a plant for the utilization of wind and waves. Fluid flow engines utilize both wind energy and wave energy for generating power therefrom. Each engine includes blades for making use of the energy of the wind. The engines operate a common turbogenerator. A low-loss power transmission is provided for transmitting power generated by the engines to the turbogenerator. This low-loss power transmission includes a pressure vessel adapted to store water under pressure to drive the turbogenerator, a conduit to pass the water under pressure to the vessel, and a pump driven by the engines to draw in the water from a water source and to deliver it through the conduit to the vessel.

U.S. Pat. No. 4,514,977, issued on May 7, 1985 to C. W. Bowen, discloses a water lift system that includes a vacuum pump attached to the top of an enclosed tank situated above a lower liquid level. A vacuum pump is utilized sequentially to draw liquid from the lower level and thereafter drain the tank for use in a low head turbine generator.

U.S. Pat. No. 6,100,600, issued on Aug. 8, 2000 to T. Pflanz, discloses a maritime power plant system with processes for storing, producing and consuming regenerative energy. The regenerative energy sources are ocean water, ocean waves, wind and solar radiation.

U.S. Pat. No. 6,359,347, issued on Mar. 19, 2000 to A. M. Wolf, discloses a siphon hydroelectric generator for generating hydroelectric power from a water source by lift water from a relatively low position to a second relatively raised position. The water is moved in a generally upward direction stepwise from a lowermost tier to an uppermost tier in a plurality of stacked tiers. The water from the water source is initially upwardly siphoned to the lowermost tier. The water from the uppermost tier is channeled down to turn a turbine-driven generator to produce electrical power.

U.S. Pat. No. 6,420,794, issued on Jul. 16, 2002 to T. D. Cao, discloses a hydropower conversion system for circulation of water between a delivering reservoir and a receiving reservoir through hydro-turbines, pumps and backup reservoirs. Water in the delivering reservoirs maintained at a constant functioning level by an adjusting valve linked with a valve control mechanism to adjust the opening and closing of passages conducting water flowing from the back-up reservoir into the delivering reservoirs. Outlets allow excess water to flow out of the back-up reservoir back down to the receiving reservoir.

U.S. Pat. No. 6,766,643, issued on Jul. 27, 2004 to H. F. Christensen, discloses a wind and wave energy plant that includes a windmill with a rotor and a wave actuated water pump that can drive a turbine whose output shaft is connected with an electric generator. The windmill includes a tubular mill tower which is firmly anchored to the seabed and encloses a storage tank between the sea surface and the mill rotor. The tank is filled with water by means of a pump by way of a non-return valve. The water is then lead to the turbine.

It is an object of the present invention to provide an apparatus that effectively stores wind energy during peak wind conditions.

It is another object of the present invention to provide an apparatus whereby the energy generating rotor of the wind energy generator can be rotated in the absence of wind.

It is a further object of the present invention to provide a wind energy generator that utilizes gravity and the action caused by fluid weight transfer for the conversion of potential energy to electrical energy.

It is still a further object of the present invention to provide an apparatus that can operate as a closed loop system for the transport of liquids and for the storage of energy.

These and other objects and advantages of the present invention will become apparent from the reading of the attached specification and appended claims.

BRIEF SUMMARY OF THE INVENTION

The present invention is an apparatus for storing and using wind energy comprising a hub, a plurality of blades extending radially outwardly from the hub, a first shaft interconnected to the hub, a generator connected to the first shaft, a first coupling means for coupling and decoupling the first shaft from the hub, a transmission connected to a portion of the first shaft opposite the hub, a second shaft extending from an end of the transmission opposite the first shaft, a second coupling means for coupling and decoupling the first shaft from the transmission, a first pulley connected to the second shaft, a second pulley positioned below the first pulley, a line extending around the first and second pulleys, at least one fluid receptacle affixed to the line, an elevated reservoir positioned adjacent the first pulley, a base reservoir positioned below the second pulley, a pump positioned between the elevated reservoir and the base reservoir, and a control valve in fluid communication with the elevated reservoir.

The first shaft is cooperative with the generator. The first shaft has a portion that extends outwardly of an end of the generator opposite the hub. The first coupling means is positioned along the first shaft. The second coupling means is positioned along the second shaft. The elevated reservoir is in fluid communication with the fluid receptacle when the fluid receptacle is adjacent the first pulley. The base reservoir is in fluid communication with the fluid receptacle when the fluid receptacle is adjacent the second pulley. The base reservoir and the elevated reservoir are in fluid communication. The pump is in fluid communication with the elevated reservoir and with the base reservoir. The pump is electrically connected to the generator. The control valve is electrically connected to the generator.

The apparatus further comprises a conduit connecting the elevated reservoir and the base reservoir so that the pump is positioned along the conduit. A tube is connected to the elevated reservoir so that the tube has an end adjacent the fluid receptacle when the fluid receptacle is adjacent the first pulley. The control valve is positioned along the tube.

Each of the first and second coupling means has a coupled position and a decoupled position. The first coupling means is in the coupled position when the second coupling means is in the decoupled position. The first coupling means is in the decoupled position when the second coupling means is in the coupled position. The first coupling means comprises a first member connected to the hub, and a second member connected to the shaft. The first member and second member are in the coupled position when the plurality of blades and the hub rotate. The first member and the second member are in the decoupled position when the plurality of blades and the hub are stationary.

The second coupling means is a clutch operatively connected to the transmission. The clutch is in the decoupled position when the plurality of blades and the hub rotate. The clutch is in the coupled position when the plurality of blades and the hub are stationary.

The apparatus further comprises a locking means for preventing a rotation of the line around the first and second pulleys when the first coupling means is in the coupled position and the second coupling means is in the decoupled position. The locking means is positioned between the second coupling means and the first pulley. The apparatus further comprises a sensor means for detecting a rotation of the plurality of blades and the hub. The sensor means is operatively connected to the locking means. The locking means has a locked position and an unlocked position. The locking means moves from the unlocked position to the locked position after the sensor means detects the rotation of the plurality of blades and the hub. The sensor means is operably connected to the first and second coupling means. The sensor means sends a signal to the first and second coupling means upon detecting a rotation of the blades.

The apparatus further comprises a controlling means operably connected to the first coupling means and to the second coupling means and to the locking means. The controlling means controls the first coupling means and the second coupling means so as to move each the first and second coupling means between the coupled position and the decoupled position. The controlling means controls the locking means so as to move the locking means between the locked position and the unlocked position. The controlling means is operably connected to the sensor means. The controlling means communicates with the sensor means. The controlling means is operably connected to the control valve. The control valve has an open position and a closed position. The controlling means controls the control valve so as to move between the open position and the closed position.

The transmission is a variable-drive transmission. The apparatus further comprises a one-way valve positioned between the pump and the elevated reservoir. The one-way valve is in fluid communication with the pump and the elevated reservoir.

The present invention is a method for storing and using wind energy including the steps of positioning a first coupler between the generator and the plurality of blades, locating the second coupler between the first pulley and the generator, rotating the generator so as to produce electric energy while the first coupler is in the coupled position and the second coupler is in the decoupled position, pumping the fluid from the base reservoir to the elevated reservoir during the step of rotating, revolving the generator so as to produce electric energy while the first coupler is in the decoupled position and the second coupler is in the coupled position, passing the fluid from the elevated reservoir to a fluid receptacle during the step of revolving, actuating the control valve to the closed position during the step of rotating the generator, locking the line during the step of rotating the generator, and controlling the first coupler and the second coupler and the control valve with a controller.

The step of passing includes positioning the fluid receptacle adjacent the first pulley, actuating a control valve from a closed position to an open position, filling the fluid receptacle with the fluid, moving the line around the first and second pulleys so as to move the fluid receptacle adjacent the second pulley, emptying the fluid receptacle adjacent the second pulley so that the fluid passes from the fluid receptacle to the base reservoir, and flowing the fluid through a tube positioned between the elevated reservoir and the fluid receptacle.

DETAILED DESCRIPTION OF THE INVENTION

Figure 1:
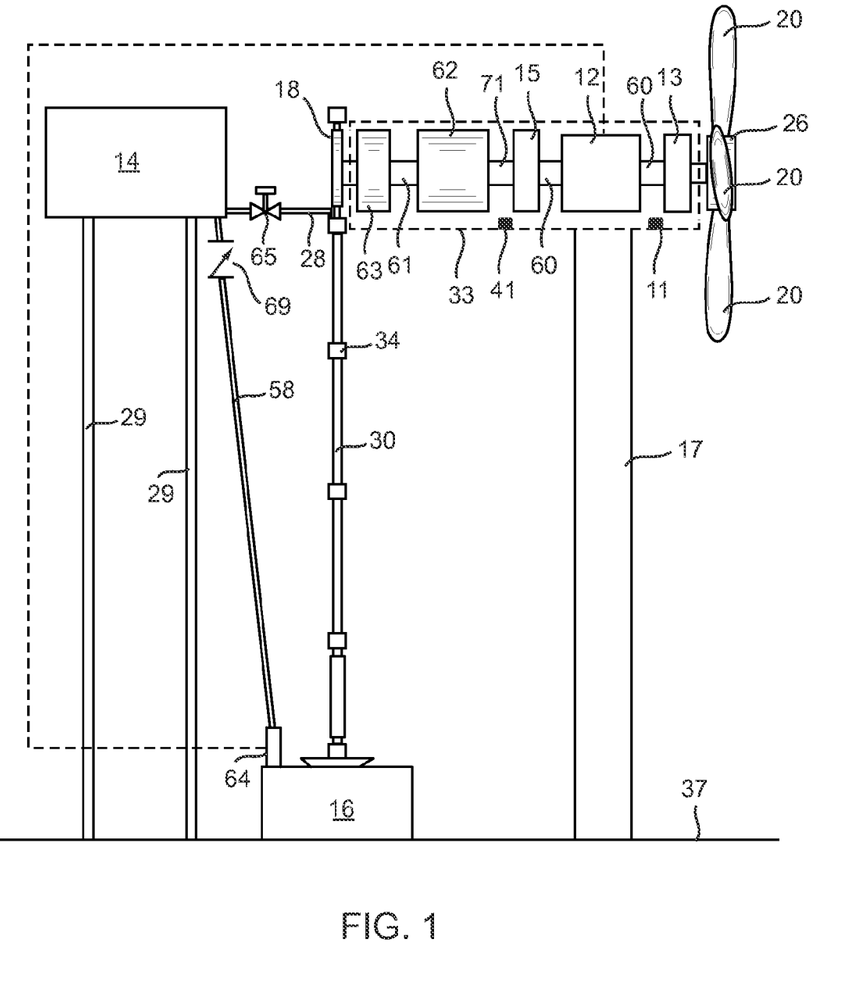
FIG. 1 shows a side elevational view of the preferred embodiment of the apparatus of the present invention.

Referring to FIG. 1, there is shown a side elevational view of the preferred embodiment of the apparatus 10 for storing and using wind energy in accordance with the teachings of the present invention. The apparatus 10 includes a hub 26, a plurality blades 14 extending radially outwardly from the hub 26, a first shaft 60 interconnected to the hub 26, a generator 12 connected to the first shaft 60, a first coupling means 13 for coupling and decoupling the first shaft 60 from the hub 26, a transmission 62 connected to a portion 71 of the first shaft 60 opposite the hub 26, a second shaft 61 extending from an end of the transmission 62 opposite the first shaft 60, a second coupling means 15 for coupling and decoupling the transmission 62 from the first shaft 60, a first pulley 18 connected to the second shaft 61, a second pulley 32 positioned below the first pulley 18, a line 30 extending around the first and second pulleys 18 and 32, fluid receptacles 34 affixed to the line 30, an elevated reservoir 14 positioned adjacent the first pulley 18, a base reservoir 16 positioned below the second pulley 32, a pump 64 positioned between the elevated reservoir 14 and the base reservoir 16, a control valve 65 in fluid communication with the elevated reservoir 14, a conduit 58 connecting the elevated reservoir 14 with the base reservoir 16, a tube 28 connected to the elevated reservoir 14, a locking means 63 for preventing a rotation of the line 30 around the first and second pulleys 18 and 32, a sensor means 11 for detecting a rotation of the blades 14 and the hub 26, a one-way valve 67 positioned between the pump 64 and the elevated reservoir 14, and a controlling means 41 for controlling the first coupling means 13, the second coupling means 15, the locking means 63, the sensor means 11, and the control valve 65.

In the preferred embodiment, the apparatus 10 has three blades 14. The hub 26 is interconnected to the first pulley 18. The first shaft 60 is interconnected to the hub 26. The generator 12 can be a typical generator with a rotor and stator, where either the rotor or the stator is positioned on the first shaft 60 so that the rotor rotates relative to the stator, or vice versa. The first shaft 60 is cooperative with the generator 12 the portion 71 of the first shaft 60 extends outwardly of the end of the generator 12 opposite the hub 26. The first coupling means 13 is positioned along the first shaft 60. The second coupling means 15 is positioned along the first shaft 60. The elevated reservoir 14 is in fluid communication with the fluid receptacle 34 when the fluid receptacle 34 is adjacent the first pulley 18. The base reservoir 16 is in fluid communication with the fluid receptacle 34 when the fluid receptacle 34 is adjacent the second pulley 32. The elevated reservoir 14 and the base reservoir 16 are in fluid communication. The pump 64 is in fluid communication with the elevated reservoir 14 and with the base reservoir 16. The pump 64 is electrically connected to the generator 12. The pump 64 is positioned along the conduit 58. The tube 28 has an end adjacent the fluid receptacle 34 when the fluid receptacle 34 is adjacent the first pulley 18. The control valve 65 is positioned along the tube 28.

The elevated reservoir 14 is located at a location above the base reservoir 16. It is not necessary that the elevated reservoir 14 be located directly above the base reservoir 16. The elevated reservoir 14 is supported by legs 29. Since the action of the present invention is based upon fluid weight transfer, it is only necessary that the elevated reservoir 14 be located at some location above the base reservoir 16. The tube 28 extends from the elevated reservoir 14 toward the first pulley 18 so that the tube 28 is adjacent the first pulley 18. Tube 28 facilitates the ability to discharge fluids from the interior of the elevated reservoir 14 when it is necessary to pass the fluids to the fluid receptacle 34, as will be described hereinafter. The control valve 65 is positioned along the tube 28 so as to selectively discharge fluid from the elevated reservoir 14.

The line 30 extends around the first pulley 18 that is interconnected to hub 26. Line 30 can be in the nature of a chain, a belt, a cable, or other mechanism which allows for the controlled movement of the line 30 around the first and second pulleys 18 and 32. The fluid receptacles 34 can be pivotally mounted to the line 30. The pulleys 18 and 32, as mentioned herein, include a wide variety of pulley-type structures, such as gears, sheaves, sprockets, friction wheels, and other mechanisms.

Conduit 58 connects the base reservoir 16 with the elevated reservoir 14. The pump 64 pumps fluid through conduit 58 back to the elevated reservoir 14. The pump 64 can be suitably electrically powered from electrical energy generated by the generator 12. A housing 33 can be used to house the first and second shafts 60 and 61, first and second coupling means 13 and 15, the generator 12, the transmission 62, and the locking means 63 so as to protect these components from the weather. The housing 33 is shown by a dashed line 33 in FIG. 1. The sensor means 11 and controlling means 41 can be placed adjacent the housing 33. The housing 33 and its contents are supported by structural support 17. Legs 29 and structural support 17 extend upwardly from the ground 37.

Each of the first and second coupling means 13 and 15 has a coupled position and a decoupled position. The first coupling means 13 is in the coupled position when the second coupling means 15 is in the decoupled position. The first coupling means 13 is in the decoupled position when the second coupling means 15 is in the coupled position. The second coupling means 15 is a clutch operatively connected to the transmission 62. The clutch is in the decoupled position when the blades 14 and the hub 26 rotate. The clutch is in the coupled position when the blades 14 and hub 26 are stationary.

The locking means 63 has a locked position and an unlocked position. The locking means 63 prevents the line 30 from rotating around the first and second pulleys 18 and 32 when the first coupling means 13 is in the coupled position and the second coupling means 15 is in the decoupled position. The locking means 63 is positioned between the second coupling means 15 and the first pulley 18.

The sensor means 11 is operatively connected to the locking means 63. The locking means 63 moves from the unlocked position to the locked position after then sensor means 11 detects the rotation of the blades 14 and hub 26. The sensor means 11 is operably connected to the first and second coupling means 13 and 15. The sensor means 11 sends a signal to the first and second coupling means 13 and 15 upon detecting a rotation of the blades 14 and hub 26.

The controlling means 41 is operably connected to the first coupling means 13, the second coupling means 15, and the locking means 63. The controlling means 41 controls the first and second coupling means 13 and 15 so as to move each of the first and second coupling means 13 and 15 between the coupled position and the decoupled position. The controlling means 41 controls the locking means 63 so as to move the locking means 63 between the locked position and the unlocked position. The controlling means 41 is operably connected to the sensor means 11 so as to communicate with the sensor means 11. The controlling means 41 is operably connected to the control valve 65. The control valve 65 has an open position and a closed position. The controlling means 41 controls the control valve 65 so as to move the control valve 65 between the open position and the closed position. The transmission 62 can be a variable-drive transmission. The one-way valve 69 is in fluid communication with the pump 64 and the elevated reservoir 14.

Figure 2:
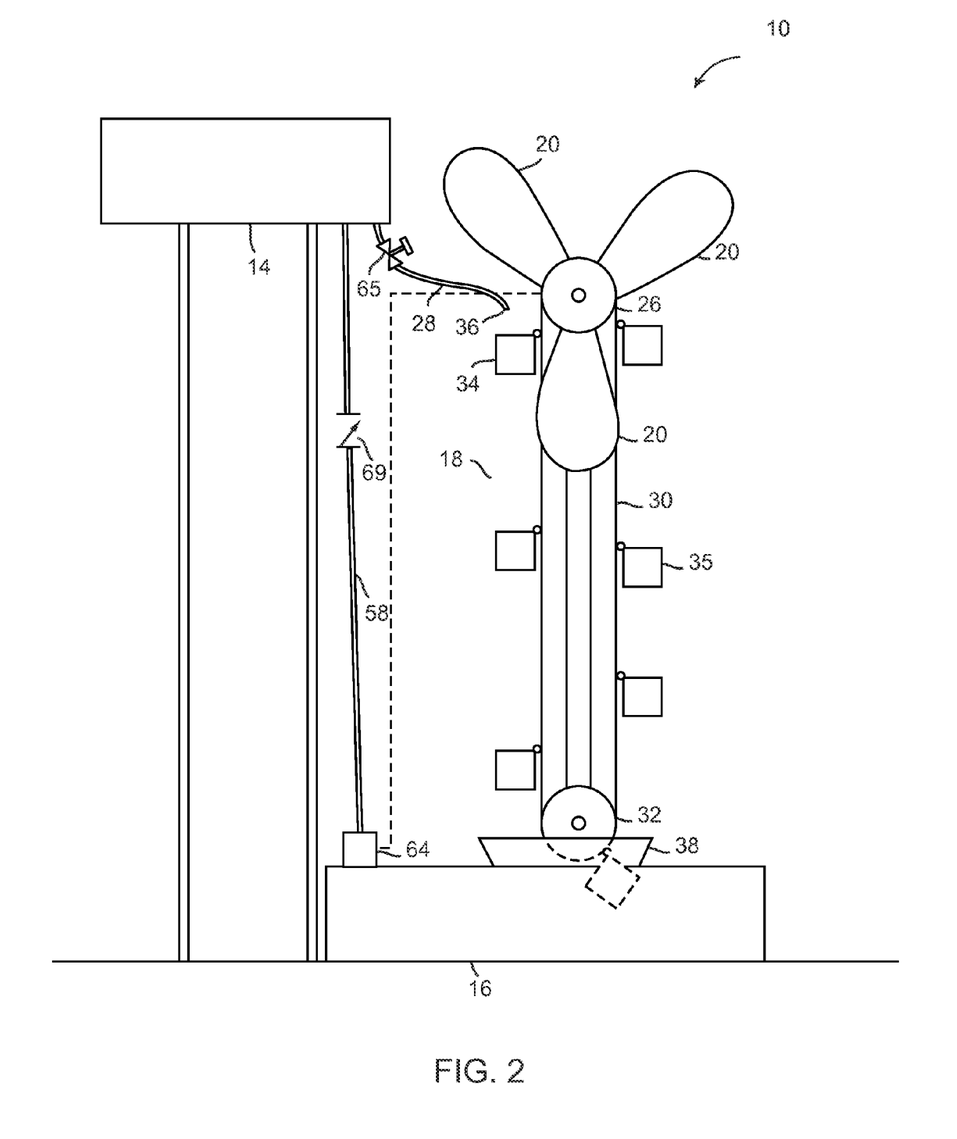
FIG. 2 shows a front elevational view of the preferred embodiment of the apparatus of the present invention.

Referring to FIG. 2, there is shown a front elevational view of the apparatus 10 of the present invention. As can be seen, the apparatus 10 has blades 20 extending outwardly from hub 26. Hub 26 is coupled to a transmission 70 that interconnects the hub 26 with a the second shaft 61 that is engaged with the first pulley 18. The line 30 is in the form of a belt that extends over the first pulley 18 and extends to the second pulley 32 located therebelow. Various fluid receptacles 34 are pivotally connected to the line 30 for the purpose of allowing fluid to be introduced therein and released therefrom into the dump chute 38 located at the top of the base reservoir 16.

As can be seen in FIG. 2, one of the fluid receptacles 34 is positioned below the outlet 36 of the tube 28 associated with the elevated reservoir 14. As such, the tube 28 can pass fluid through the outlet 36 and into the fluid receptacle 34. Fluid receptacle 34 can be in the nature of a bucket. When the fluid receptacle 34 is suitably filled, the fluid receptacle 34 drifts downwardly by action of gravity. This causes a rotation of the line 30 around the first pulley 18 and the second pulley 32. When the loaded bucket 34 reaches its lowermost position, it can discharge its fluid contents into a dump chute 38 in communication with the interior of the base reservoir 16. The weight of the fluid within the fluid receptacles 34 causes the empty receptacles 35 to move upwardly on the other side of the pulleys 18 and 32.

The elevated reservoir 14 is located at a location above the base reservoir 16. The elevated reservoir 14 has a tube 28 has that has an outlet 36 positioned so as to allow fluid from the reservoir 14 to be dumped into the fluid receptacle 34. Once the fluid receptacle 34 is full, it drops by action of gravity downwardly toward the base reservoir 16. The line 30 rotates the pulleys 32 and 18. When one of the fluid receptacles 34 reaches the dump chute 38, another receptacle 34 can be in position for receiving the fluid from the elevated reservoir 14. The number of fluid receptacles 34 should be in accordance with the proper design requirements of the system.

In normal use, the blades 20 rotate in response to wind. The blades 20 and the hub 26 together rotate the first shaft 60 so as to produce electricity in the generator 12. Blades 20 easily rotate in strong wind conditions. During such strong wind conditions, the energy generated by the generator 12 can be passed to the pump 64. During peak wind conditions, the second coupling means 15 decouples the hub 26 from the second shaft 61. The locking means 63 moves to a locked position. As a result, the various fluid receptacles 34 remain in a relatively stationary position.

In the event of a low wind or non-peak wind condition, the blades 20 stop rotating, along with the hub 26. At this time, the transmission 70 couples, via the second coupling means 15, with the first shaft 60 so as to turn the generator 12. The control valve 65 in fluid communication with the elevated reservoir 14 is moved by the controller 41 to the open position so as to allow fluid to flow to the fluid receptacle 34 through the tube 28. When the fluid receptacle 34 is suitably filled, the force of gravity forces the fluid receptacle 34 downwardly toward the base reservoir 16. This causes a rotation of the pulleys 18 and 32 and the second shaft 61, along with a rotation of the transmission 62 and generator 12. The electrical energy generated can be use in a conventional manner during such low wind and non-peak wind conditions when no energy would be otherwise generated for use.

To start the apparatus 10, a fluid, such as water, must be placed in the base reservoir 16. As wind blows across the blades 20 of the apparatus 10 during peak wind conditions, the blades 20 and hub 26 rotate the generator 12 to make electric energy, or electricity. Some of the generated electricity is passed to the pump 64, which pumps fluid from the base reservoir 16 to the elevated reservoir 14. When the blades 20 rotate to generate electricity in peak wind conditions, the apparatus 10 is configured so that the first coupling means 13 is in the coupled position, the second coupling means 15 is in the decoupled position, the locking means 63 is in the locked position, and the control valve 65 is in the closed position. In this configuration, the first shaft 60 rotates; however, the second coupling means 15 is decoupled so that the transmission 62, the locking means 63, the pulleys 18 and 32, the line 30, and the fluid receptacles 34 do not rotate. The controlling means 41 can control the positions of the coupling means 13 and 15 and the locking means 63, and the controlling means 41 can be powered by the electricity generated by the generator 12 during rotation of the blades 20 and hub 26. The controlling means 41 can also provide power to the sensor means 11, and the control valve 65.

The size of the base and elevated reservoir 16 and 14 are calculated according to the wind conditions for a particular location. Larger reservoir sizes will be needed for areas with long periods of peak and non-peak wind conditions. Smaller reservoir sizes will be needed for areas with shorter periods of peak and non-peak wind conditions.

As wind slows to a non-peak wind condition which is not strong enough to rotate the blades 20 and hub 26, the generator 12 ceases to make electricity. Thus, the pump 64, controlling means 41, sensor means 11, locking means 63, first and second coupling means 13 and 15, and control valve 65 lose their electricity supply. With no electricity, the pump 64 turns off. The fluid that was pumped from the base reservoir 16 to the elevated reservoir 14 remains in the elevated reservoir 14 because one-way valve 69 prevents backwards flow of the fluid in conduit 58. With no electricity, the locking means 63 automatically moves from the locked position to the unlocked position so as to allow the line 30 and fluid receptacles 34 to freely rotate around the pulleys 18 and 32. With no electricity, the first coupling means 13 moves from the coupled position to the decoupled position so that first shaft 60 can rotate independently of the blades 20. With no electricity, the second coupling means 15 moves from the decoupled position to the coupled position so that the first shaft 60, second shaft 61, transmission 62, first and second pulleys 18 and 32, line 30, and fluid receptacles 34 can rotate together. With no electricity, the control valve 65 moves from the closed position to the open position so as to allow fluid to flow from the elevated reservoir 14, through tube 28, and into fluid receptacle 34.

The apparatus 10 can easily change between the two configurations discussed above as wind changes between peak and non-peak wind conditions. The exact electrical wiring among the controlling means 41, sensor means 11, first and second coupling means 13 and 15, locking means 63, and control valve 65 can vary according to proper engineering specifications. For example, the sensor means 11 could be powered directly by the generator 12 so as to send a signal to the controlling means 41, or the sensor means 11 could be powered by the controlling means 41, which is powered by the generator 12.

The apparatus 10 can be configured without a sensor means 11. The controlling means 41 could simply operate without a sensor means 11 and either receive electric power during peak wind conditions from the generator 12 or not receive electric power during non-peak wind conditions. In this case, the controlling means 41 would control the components when there is power, and the components would be configured to have a default position when there is no power. The default position would be for the first coupling means 13 to be in the decoupled position, for the second coupling means 15 to be in the coupled position, for the locking means 63 to be in the unlocked position, and for the control valve 65 to be in the open position.

Figure 3:
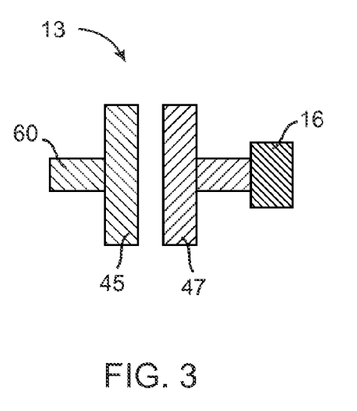
FIG. 3 shows an isolated side elevation view of the first coupler of the present invention.

Referring to FIG. 3, there is shown an isolated side elevational view of the first coupling means 13 of the present invention in the decoupled position. The first coupling means 13 has a first member 47 connected to the hub 26 and a second member 45 connected to the shaft 60. The first member 47 and second member 45 are in the decoupled position when the blades 20 and hub 26 are stationary. There is a space between the first and second members 47 and 45 in the decoupled position. The first member 47 and second member 45 are in the coupled position when the blades 20 and 16 rotate. The first and second members 47 and 45 are adjacent to each other in the coupled position.

The method for storing and using wind energy includes the steps of positioning a first coupler 13 between a generator 12 and a plurality of blades 20 of a wind turbine, locating a second coupler 15 between a first pulley 18 and the generator 12, rotating the generator 12 so as to produce electric energy while the first coupler 13 is in a coupled position and the second coupler 15 is in a decoupled position, pumping a fluid from a base reservoir 16 to an elevated reservoir 14 during the step of rotating, revolving the generator 12 so as to produce electric energy while the first coupler 13 is in the decoupled position and the second coupler 15 is in the coupled position, passing the fluid from the elevated reservoir 14 to a fluid receptacle 34 during the step of revolving, actuating the control valve 65 to the closed position during the step of rotating the generator 12, locking the line 30 during the step of rotating the generator 12, and controlling the first coupler 13 and the second coupler 15 and the control valve 65 with a controller 41.

The step of passing includes positioning the fluid receptacle 34 adjacent the first pulley 18, actuating a control valve 65 from a closed position to an open position, filling the fluid receptacle 34 with the fluid, moving the line 30 around the first and second pulleys 18 and 32 so as to move the fluid receptacle 34 adjacent the second pulley 32, emptying the fluid receptacle 34 adjacent the second pulley 32 so that the fluid passes from the fluid receptacle 34 to the base reservoir 16, and flowing the fluid through a tube 28 positioned between the elevated reservoir 14 and the fluid receptacle 34.

The foregoing disclosure and description of the invention is illustrative and explanatory thereof. Various changes in the details of the illustrated construction and method can be made within the scope of the appended claims without departing from the true spirit of the invention. The present invention should be limited only by the following claims and their legal equivalents.

I claim:

1. An apparatus for storing and using wind energy comprising:
    a hub;
    a plurality of blades extending radially outwardly from said hub;
    a first shaft interconnected to said hub;
    a generator connected to said first shaft, said first shaft cooperative with said generator, said first shaft having a portion extending outwardly of an end of said generator opposite said hub;
    a first coupling means for coupling and decoupling said first shaft from said hub, said first coupling means positioned along said first shaft;
    a transmission connected to said portion of said first shaft opposite said hub;
    a second shaft extending from an end of said transmission opposite said first shaft;
    a second coupling means for coupling and decoupling said first shaft from said transmission, said second coupling means being positioned along said second shaft;
    a first pulley connected to said second shaft;
    a second pulley positioned below said first pulley;
    a line extending around said first and second pulleys;
    at least one fluid receptacle affixed to said line;
    an elevated reservoir positioned adjacent said first pulley, said elevated reservoir being in fluid communication with the fluid receptacle when the fluid receptacle is adjacent said first pulley;
    a base reservoir positioned below said second pulley, said base reservoir being in fluid communication with the fluid receptacle when the fluid receptacle is adjacent said second pulley, said base reservoir and said elevated reservoir being in fluid communication;
    a pump positioned between said elevated reservoir and said base reservoir, said pump being in fluid communication with said elevated reservoir and with said base reservoir, said pump being electrically connected to said generator; and
    a control valve in fluid communication with said elevated reservoir, said control valve being electrically connected to said generator.

2. The apparatus of claim 1, further comprising:
    a conduit connecting said elevated reservoir and said base reservoir, said pump being positioned along said conduit.

3. The apparatus of claim 1, further comprising:
    a tube connected to said elevated reservoir, said tube having an end adjacent the fluid receptacle when the fluid receptacle is adjacent said first pulley, said control valve being positioned along said tube.

4. The apparatus of claim 1, each of said first and second coupling means having a coupled position and a decoupled position, said first coupling means being in said coupled position when said second coupling means is in said decoupled position, said first coupling means being in said decoupled position when said second coupling means is in said coupled position.

5. The apparatus of claim 4, said first coupling means comprising:
    a first member operably connected to said hub; and
    a second member connected to said first shaft, said first member and second member being in said coupled position when said plurality of blades and said hub rotate, said first member and said second member being in said decoupled position when said plurality of blades and said hub are stationary.

6. The apparatus of claim 4, said second coupling means being a clutch operatively connected to said transmission, said clutch being in said decoupled position when said plurality of blades and said hub rotate, said clutch being in said coupled position when said plurality of blades and said hub are stationary.

7. The apparatus of claim 4, further comprising:
    a locking means for preventing a rotation of said line around said first and second pulleys when said first coupling means is in said coupled position and said second coupling means is in said decoupled position, said locking means being positioned between said second coupling means and said first pulley.

8. The apparatus of claim 7, said locking means having a locked position and an unlocked position, said locking means for moving from said unlocked position to said locked position after said sensor means detects the rotation of said plurality of blades and said hub.

9. The apparatus of claim 7, further comprising:
    a controlling means operably connected to said first coupling means and to said second coupling means and to said locking means.

10. The apparatus of claim 9, said controlling means for controlling said first coupling means and said second coupling means so as to move each said first and second coupling means between said coupled position and said decoupled position.

11. The apparatus of claim 10, said controlling means for controlling said locking means so as to move said locking means between said locked position and said unlocked position.

12. The apparatus of claim 10, said controlling means operably connected to said control valve, said control valve having an open position and a closed position, said controlling means for controlling said control valve so as to move between said open position and said closed position.

13. The apparatus of claim 9, further comprising:
a sensor means for detecting a rotation of said plurality of blades and said hub, said sensor means being operatively connected to said locking means, said sensor means being operably connected to said first and second coupling means.

14. The apparatus of claim 13, said controlling means operably connected to said sensor means, said controlling means for communicating with said sensor means.

15. The apparatus of claim 1, said transmission being a variable-drive transmission.

16. The apparatus of claim 2, further comprising:
a one-way valve positioned between said pump and said elevated reservoir, said one-way valve being in fluid communication with said pump and said elevated reservoir.

17. A method for storing and using wind energy comprising:
positioning a first coupler between a generator and a plurality of blades of a wind turbine, said first coupler having a coupled position and a decoupled position;
locating a second coupler between a first pulley and said generator, said second coupler having a coupled position and a decoupled position;
rotating said generator so as to produce electric energy while said first coupler is in said coupled position and said second coupler is in said decoupled position;
pumping a fluid from a base reservoir to an elevated reservoir during said step of rotating;
generating electric energy while said first coupler is in said decoupled position and said second coupler is in said coupled position; and
passing said fluid from said elevated reservoir to a fluid receptacle during the step of generating, said fluid receptacle being affixed to a line rotatably positioned around a first pulley and a second pulley, said first pulley being operably connected to said second coupler.

18. The method of claim 17, said step of passing comprising:
positioning said fluid receptacle adjacent said first pulley;
actuating a control valve from a closed position to an open position;
filling said fluid receptacle with said fluid;
moving said line around said first and second pulleys so as to move said fluid receptacle adjacent said second pulley, said second pulley being positioned below said first pulley; and
emptying said fluid receptacle adjacent said second pulley so that said fluid passes from said fluid receptacle to said base reservoir.

19. The method of claim 18, said step of passing further comprising:
flowing said fluid through a tube positioned between said elevated reservoir and said fluid receptacle, said control valve being positioned along said tube.

20. The method of claim 18, further comprising:
actuating said control valve to said closed position during the step of rotating;
locking said line during the step of rotating; and
controlling said first coupler and said second coupler and said control valve with a controller.

* * * * *